US009007208B2

(12) United States Patent
Jerzak et al.

(10) Patent No.: US 9,007,208 B2
(45) Date of Patent: Apr. 14, 2015

(54) SELF-CONFIGURING SYSTEM FOR REAL-TIME HEALTH MONITORING OF MANUFACTURING EQUIPMENT

(71) Applicants: Zbigniew Jerzak, Dresden (DE); Yuanzhen Ji, Dresden (DE)

(72) Inventors: Zbigniew Jerzak, Dresden (DE); Yuanzhen Ji, Dresden (DE)

(73) Assignee: SAP SE, Walldorf (DE)

( * ) Notice: Subject to any disclaimer, the term of this patent is extended or adjusted under 35 U.S.C. 154(b) by 97 days.

(21) Appl. No.: 13/915,787

(22) Filed: Jun. 12, 2013

(65) Prior Publication Data

US 2014/0368340 A1    Dec. 18, 2014

(51) Int. Cl.
G08B 21/00    (2006.01)
G08B 21/18    (2006.01)

(52) U.S. Cl.
CPC ................................ *G08B 21/182* (2013.01)

(58) Field of Classification Search
USPC ................ 340/540, 539.22, 539.26, 541, 340/545.3–545.9, 564, 568.1–568.3, 340/572.1–572.9
See application file for complete search history.

(56) References Cited

U.S. PATENT DOCUMENTS

| 5,001,933 A * | 3/1991 | Brand ............................. 73/651 |
| 5,283,943 A * | 2/1994 | Aguayo et al. ................. 29/701 |
| 2006/0144997 A1* | 7/2006 | Schmidt et al. ........... 244/100 R |
| 2008/0176713 A1* | 7/2008 | Olivera Brizzio et al. ........ 482/8 |
| 2009/0059842 A1* | 3/2009 | Maltseff et al. ............... 370/328 |
| 2010/0076714 A1* | 3/2010 | Discenzo ...................... 702/104 |

OTHER PUBLICATIONS

Aggarwal et al. "A framework for projected clustering of high dimensional data streams." *Proceedings of the Thirtieth International Conference on VLDB Conference.* Toronto, Canada. VLDB Endowment. (2004):852-863.
Agogino et al. "Multiple sensor expert system for diagnostic reasoning, monitoring and control of mechanical systems." *Mechanical Systems and Signal Processing.* 2(2) (1988):165-188.
Chen et al. "Density-Based Clustering for Real-Time Stream Data." *Proceedings of the 13th ACM SIGKDD International Conference on Knowledge Discovery and Data Mining, KDD '07.* Aug. 12-15, 2007, San Jose, California. New York, NY, USA, ACM (2007): 133-142.
Du et al. "Automated Monitoring of Manufacturing Processes, Part 1: Monitoring Methods." *Journal of Engineering for Industry.* 117 (1995):121-132.
Fox et al. "Techniques for Sensor-Based Diagnosis." *Proceedings of the Eighth International Joint Conference on Artificial Intelligence.* Aug. 8-12, 1983, Karlsruhe, West Germany. Morgan Kaufmann Publishers Inc. San Francisco, CA, USA. vol. 1 (1983): 158-163.

(Continued)

*Primary Examiner* — Daniel Previl
(74) *Attorney, Agent, or Firm* — Mintz Levin Cohn Ferris Glovsky and Popeo, P.C.

(57) ABSTRACT

Data is received that comprises at least one data stream derived from each of a plurality of sensors that each characterize one or more attributes of equipment components. Thereafter, using the received data and a density-based clustering algorithm that produces micro-clusters for each pair of sensors, correlated sensors having component correlations above a pre-defined threshold are identified. It can then be determined that data from two or more correlated sensors triggers at least one alert event. Subsequently, data is provided that characterizes the at least one alert event. Related apparatus, systems, techniques and articles are also described.

20 Claims, 10 Drawing Sheets

(56) References Cited

OTHER PUBLICATIONS

Gama. "A survey on learning from data streams: current and future trends." *Progress in Artificial Intelligence.* 1(2012):45-55.
Garcia et al. "Sensor data analysis for equipment monitoring." *Knowl. Inf. Syst.* 28(2):(Aug. 2011):333-364.
Guha et al. "Clustering Data Streams: Theory and Practice." *IEEE Trans. on Knowl. and Data Eng.*vol. 15(3) (May/Jun. 2003):515-528.
Jardine et al. "A review on machinery diagnostics and prognostics implementing condition-based maintenance." *Mechanical Systems and Signal Processing.* 20(2006):1483-1510.
Jerzak et al. "The DEBS 2012 Grand Challenge." *DEBS* '12 Jul. 16-20, 2012 Berlin, Germany. (2012):393-398.
Khalilian et al. "Data Stream Clustering: Challenges and Issues." *Proceedings of the International MultiConference of Engineers and Computer Scientists.* vol. I. IMECS 2010, Mar. 17-19, 2010 Hong Kong (2010). 3 pages.
Luckham, David. *The Power of Events: An Introduction to Complex Event Processing in Distributed Enterprise Systems.* Boston: Addison-Wesley Longman Publishing Co., Inc. (2002).[Bibliographic pages and Table of Contents-9 pages].
Ntoutsi et al. "Density-based Projected Clustering over High Dimensional Data Streams." *Proceedings of the 12th SIAM International Conference on Data Mining.*(SDM), SIGMOD '96(2012):987-998.
Qin et al. "Semiconductor manufacturing process control and monitoring: A fab-wide framework." *Journal of Process Control.* 16(2006):179-191.
Zhang et al. "Birch: An Efficient Data Clustering Method for Very Large Databases." *SIGMOD* '96, Montreal Canada. ACM. (1996):103-114.

\* cited by examiner

SELF-CONFIGURING SYSTEM FOR REAL-TIME HEALTH MONITORING OF MANUFACTURING EQUIPMENT

TECHNICAL FIELD

The subject matter described herein relates to a system for monitoring, in real time, a plurality of sensors for manufacturing equipment in order to characterize whether such equipment is operating as desired.

BACKGROUND

One of the major problems faced by the high-tech manufacturing industry is the need for automated and timely detection of anomalies which can lead to failures of the manufacturing equipment. Failures of the high-tech manufacturing equipment have a direct negative impact on the operating margin and consequently profit of the high-tech manufacturing industry.

Automated and timely detection of anomalies is a difficult problem, the major challenge being the need to understand the interactions between large numbers of machine components. Even very experienced system engineers are not aware of all interactions, especially if those need to be derived from high velocity sensor data. This, in turn, makes it impossible to recognize early warning signals and take action before failure happens.

In particular, high-tech manufacturing equipment, such as photolithography systems or vapor depositions systems, can contain thousands of components which are monitored by hundreds of digital and analog sensors. The sheer size and complexity of the data which is delivered by the sensors monitoring such systems makes it very challenging for system engineers to detect abnormal behavior leading to failures. The two major challenges faced by the system engineers are: (1) the need to know what to monitor and (2) the ability to extract higher level information from raw sensor data in real-time.

SUMMARY

In one aspect, data is received that comprises at least one data stream derived from each of a plurality of sensors that each characterize one or more attributes of equipment components. Thereafter, using the received data and a density-based clustering algorithm that produces micro-clusters for each pair of sensors, correlated sensors having component correlations above a pre-defined threshold are identified. It can then be determined that data from two or more correlated sensors triggers at least one alert event. Subsequently, data is provided that characterizes the at least one alert event.

The density-based clustering algorithm can be an HDDStream algorithm.

Component correlations can be identified by generating clusters by observing temporal dependencies among processing actions and/or behavior of individual components for each of a plurality of paired sensors during operation of the equipment components during a pre-defined training period. Component interactions can be dropped that have criteria below a pre-defined threshold.

The component correlations can be identified during a pre-defined training period and/or during runtime.

Providing data can include one or more of: displaying the data characterizing the alert event, loading the data characterizing the alert event, storing the data characterizing the alert event, and transmitting the data characterizing the alert event to a remote system.

An event correlation diagram and/or a component interaction diagram that characterizes the alert event can be rendered and displayed.

Computer program products are also described that comprise non-transitory computer readable media storing instructions, which when executed by one or more data processors of one or more computing systems, causes at least one data processor to perform operations herein. Similarly, computer systems are also described that may include one or more data processors and a memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The subject matter described herein provides many advantages. For example, the current subject matter provides real-time analysis of component interactions in high-tech manufacturing equipment. Such an arrangement automatically discovers (based on the available sensor data) correlations between machine components and helps engineers analyze them in real-time so as to be able to detect deterioration of the manufacturing equipment conditions in a timely fashion.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

Like reference symbols in the various drawings indicate like elements.

DETAILED DESCRIPTION

As will be described in further detail below, the current subject matter helps systems engineers cope with issues deriving from multi-component manufacturing equipment by automatically selecting only meaningful component correlations to monitor. The current subject matter exposes a set of parameters to drive the selection process. These parameters can be easily adjusted by the system engineers to meet their desired level of insight. The current subject matter is also able to automatically derive component interaction diagrams with only minimum prior knowledge as to the setup of the machine. Component interaction diagrams represent direct feedback to the engineers tuning the selection process parameters.

Moreover, the current subject matter allows system engineers to perform real-time analysis of high velocity raw sensor data. Having automatically selected component correlations to monitor, the current subject matter utilizes density-based stream data clustering algorithms to group sensor readings within each correlation and monitor statistical properties of each group, focusing on the calculation of the long time trend. One example of a density-based stream data clustering algorithm is the HDDStream algorithm described in: I. Ntoutsi, A. Zimek, T. Palpanas, P. Kröger, and H.-P. Kriegel. *Density-based projected clustering over high dimensional data streams*, In Proceedings of SDM, pages 987-998 (2012), the contents of which are hereby fully incorporated by reference.

Combined with rules defined by the system engineers, the current subject matter provides real-time alerting functionality allowing for a timely detection of anomalies.

Figure 1:
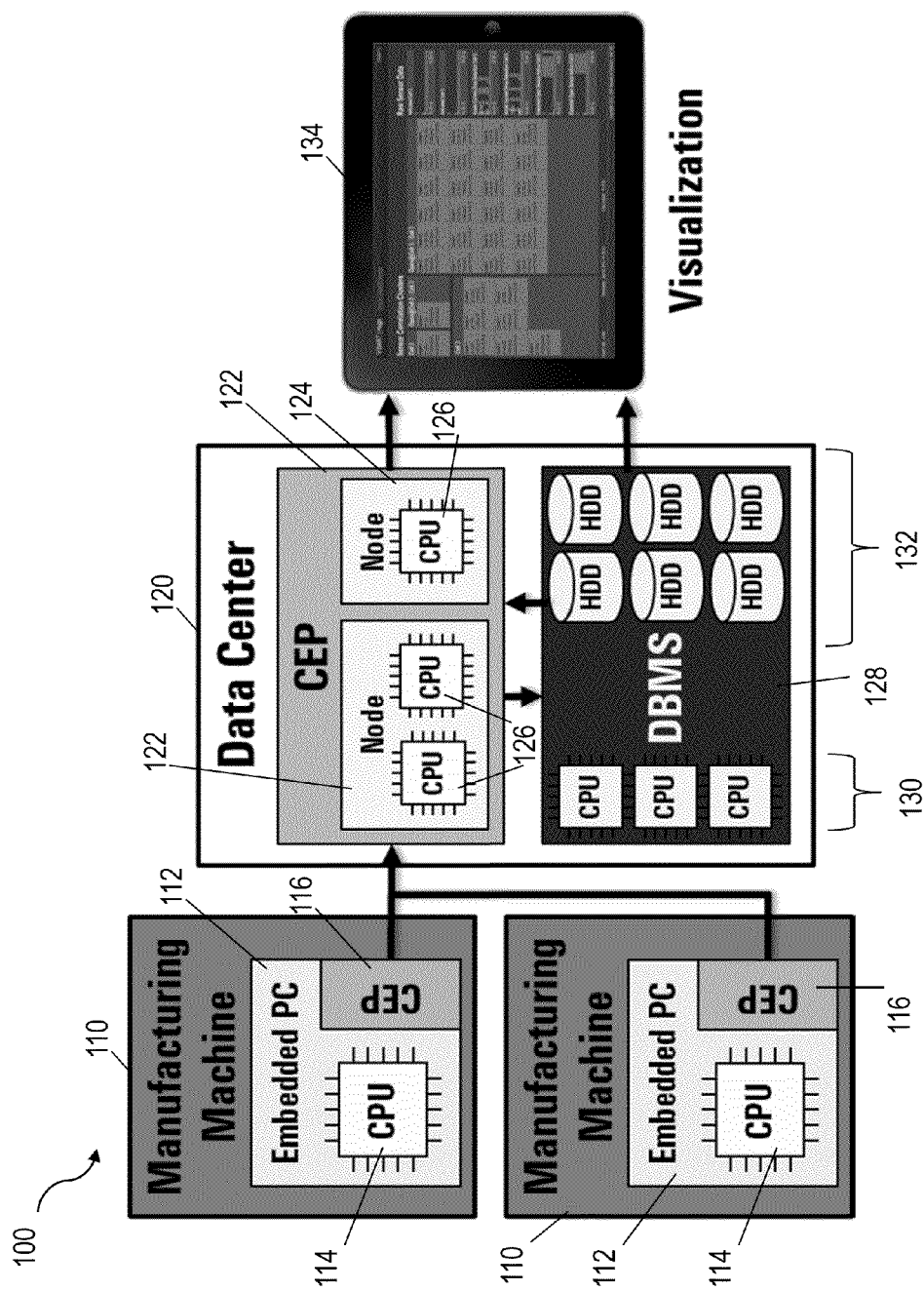
FIG. 1 is a system architecture diagram for implementing real-time health monitoring of manufacturing equipment.

FIG. 1 is a diagram 100 illustrating a system architecture to implement the current subject matter. Each of a plurality of manufacturing machines 110 can be monitored by one or more embedded sensors 112 (having corresponding CPUs 114) with each sensor monitoring a specific machine component. Producing product items by a manufacturing machine 110 can involves multiple processing steps. A certain processing step such as patterning or deposition can require the interaction and collaboration of several machine components with each component being responsible for a certain processing action. Same processing steps are repeated for each product item processed on the machine. As a result, the same machine component interactions can also repeated in the iterating processing steps. Sensors 112 embedded in the manufacturing machines 110 can collect information about the processing actions of machine components at a fixed frequency. Each manufacturing machine 10 can also include a complex event processing (CEP) interface 116.

The high frequency sensor data generated by the embedded sensors 112 can be collected by a CEP engine 122 which runs on an embedded computer (PLC). The streaming sensor data originating from each machine is subsequently forwarded to the data center, which consists of a CEP system and a database system. The CEP system is responsible for on-line processing of the raw sensor data by correlating data from different sensors and analyzing the correlations using the extended HDDStream [8] algorithm. In parallel, the raw sensor data and the processing results can be persisted into the database system for further, offline root cause analysis. As a last step, the processing results are visualized through a browser-based user interface and system engineers are notified about the occurrence of critical events.

Monitoring sensors produce either digital or analog signals. Analog sensors monitor aspects such as current flowing through and voltage of different parts of the machine. Binary digital sensors produce a state transition (from 0 to 1 or vice verse) whenever a processing action is taken by the corresponding machine component. Detailed description of the sensors can be found in Z. Jerzak, T. Heinze, M. Fehr, D. Grober, R. Hartung, and N. Stojanovic. The debs 2012 grand challenge. *In Proceedings of the 6th ACM International Conference on Distributed Event-Based Systems*, DEBS '12, pages 393-398, New York, N.Y., USA (2012), the contents of which are hereby incorporated by reference. To reduce the data processing complexity, one can first convert analog signals into digital ones using user-specified rules. Without loss of generality, the examples provided herein describe the use of digital sensors which produce just two different values: 0 and 1. Nevertheless, the proposed approach can easily be extended and applied to digital sensors producing multiple values.

The goal of the sensor data analysis is to monitor whether the interaction between pairs of related components in the machine adheres to certain time regimes. More specifically, one can inspect the interaction in terms of the delay between the processing actions taken by the related components. Below is described how sensors are correlated with each other, how the streaming data clustering method can applied to analyze the temporal dependency between machine components, and how a clustering algorithm to solve the specific interaction monitoring problem.

Figure 2:
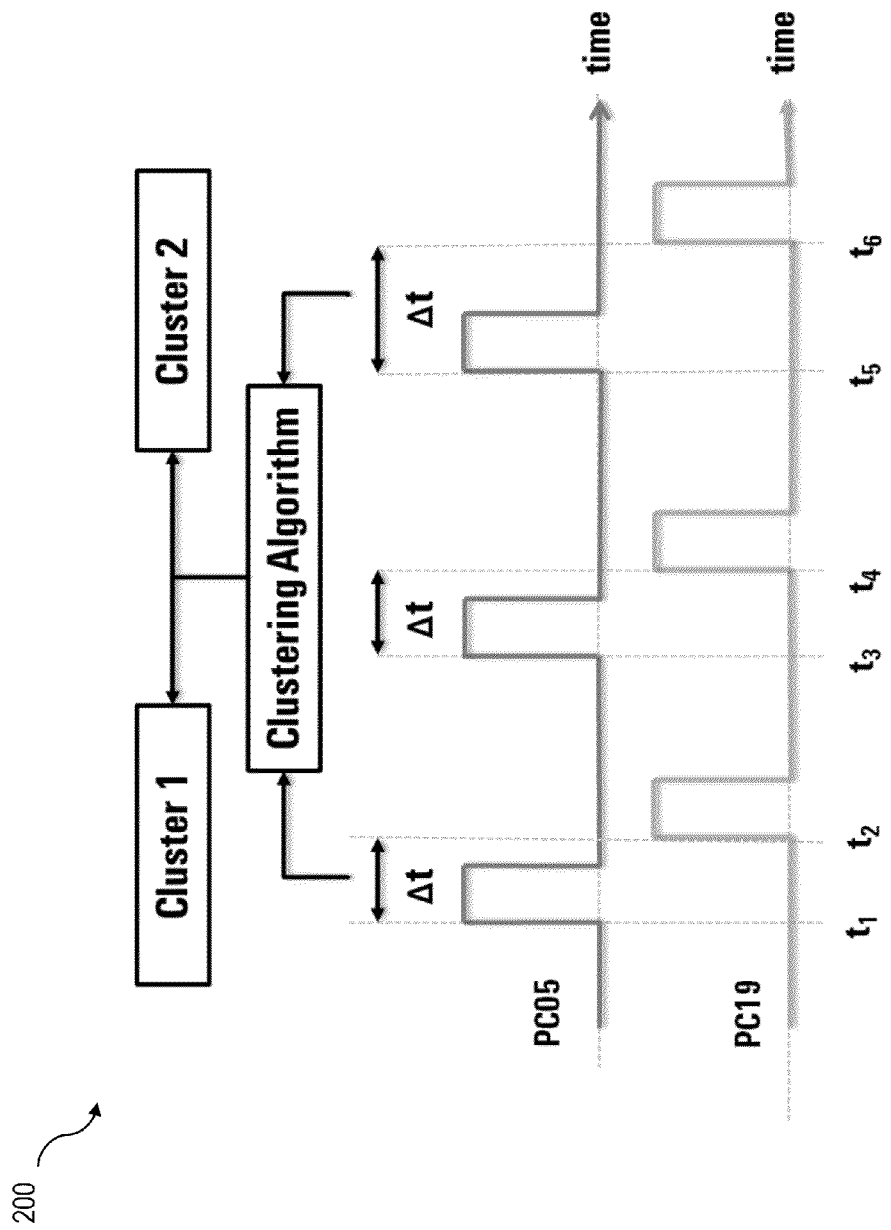
FIG. 2 is a diagram illustrating sensor pair analysis by clustering the delay between temporally adjacent raising edges.

Interdependence between two related machine components can be studied by correlating the sensor data from the two components. FIG. 2 is a diagram 200 that illustrates signals from a pair of digital sensors (for differing components) over time. This diagram 200 also illustrates how the two sensors are correlated and analyzed. Each transition from the "off" state to the "on" state (the raising edge) of a sensor indicates an occurrence of a processing action. As described above, processing steps repeat for each production item processed by the machine. Therefore, one can observe a repeating state transition pattern in the signal series. To study the temporal dependency between two processing actions, each raising edge of Sensor A is correlated with the following raising edge of Sensor B in the same processing step. The delay ($\Delta t$) between these two state transitions is measured and subject to clustering. The same correlation procedure is repeated in each iteration of the corresponding processing step, producing a stream of delay measurements. It can be observed in the diagram 200 of FIG. 2 that the first two delay measurements ($t_2-t_1$ and $t_4-t_3$) are almost equal, while the third one ($t_6-t_5$) is significantly longer. As the result of clustering, the first two delay measurements will be assigned to the same cluster (Cluster 1) while the third one will be assigned to a second cluster (Cluster 2).

Delay measurements can be continuously fed into the clustering algorithm. After a certain training period (e.g. 24 hours, etc.), data points in clusters which contain members under a pre-defined threshold (e.g. less than 10, etc.) can be considered as erroneous. This in turn, suggests an abnormal interaction between the corresponding pair of machine components. By means of clustering, system engineers can be automatically presented only with the data which is already considered to be a manifestation of an abnormal behavior.

A density-based stream data clustering algorithm, such as HDDStream, can be used to perform data analyzing. Density-based stream clustering algorithms, in some implementations, are preferred over the k-means-based clustering method, because k-means-based clustering requires one to know the desired number of clusters (k) produced by the algorithm in the final solution, and the algorithm assumes that the number of clusters remains constant. This assumption does not hold in real-world scenarios of constantly evolving data streams. In contrast, density-based approaches do not demand a priori knowledge of the number of clusters.

Because data streams are unbounded, it is impossible to maintain clusters by keeping all the historical data points. Therefore, with the current subject matter, a structure can be utilized a summarizing structure referred to herein as a micro-cluster. A micro-cluster can be configured to only keep sufficient statistics of a set of data points, for instance, a number N which represents the total number of data points in the cluster, and a vector, of the same dimension of data points, which stores the linear sum or square sum of the N points. With some variations, single data points are not maintained by micro-clusters.

HDDStream introduces two types of micro-clusters to cope with the evolving feature of data streams: potential core micro-clusters and outlier micro-clusters. A potential core micro-cluster is a micro-cluster which collects more than $N_{min}$ data points within a limited radius c in a projected subspace, while an outlier micro-cluster is a micro-cluster whose density has not reached the pre-specified density threshold. An outlier micro-cluster may collect more and more data points over time and evolve into a potential core micro-cluster when its density reaches $N_{min}$. Vice verse, a potential core micro-cluster may also lose density over time and degrade to an outlier micro-cluster.

The reason for the density loss is that, to give a higher level of importance to the most recent data, each data point in HDDStream is assigned a weight via an aging function. The weight of a data point exponentially decreases with time t according to the function $f(t)=2^{\lambda \cdot t}$, where $\lambda(>0)$ is a user-configurable decay factor. For example, given the current time t, the weight for a data point $p_i$ which arrived earlier at $t_i$ is $2^{-\lambda(t-t_i)}$. Since data points are summarized by micro-clusters, the statistics maintained in the micro-clusters decays over time in the same way. Consequently, HDDStream employs a temporal extension of micro-clusters. Each micro-cluster at time t contains three statistic components for a set C of d-dimensional data points:

CF1(t): a d-dimensional vector of the weighted linear sum of the points in each dimension.
CF2(t): a d-dimensional vector of the weighted square sum of the points in each dimension.
W(t): sum of the weights of the data points.

Representation of the Radius Threshold.

The region covered by a micro-cluster in the dimensional feature space is determined by the current center of the micro-cluster and its radius. The radius threshold $\epsilon$ defines the boundary of a micro-cluster. A data point p can be assigned to an existing micro-cluster mc iff the addition of p to mc does not affect the boundary of mc.

For the machine monitoring scenario described herein, the target items to be clustered is the temporal delay between pairs of processing actions. Therefore, the data point has only one dimension. As a result, the functions for calculating the center and radius of a micro-cluster can be simplified into the following form:

$$\text{center(mc)} = CF1(t)/W(t)$$

$$\text{radius(mc)} = \sqrt{\frac{CF2(t)}{W(t)} - \left(\frac{CF1(t)}{W(t)}\right)^2}$$

Note that CF1(t) and CF2(t) is now a scalar rather than a vector.

In HDDStream, the radius threshold of a micro-cluster is a parameter which can be specialized with an absolute value. In other words, all micro-clusters have the same maximal radius. Whereas, one can have the observation that different pairs of related processing actions are usually sensitive to variations in the delay to a different extent. More specifically, if the normal delay between one pair of processing actions is around 10 seconds, then 1 second's variance is already a critical event of which the system engineer needs to be notified. To that end the clustering algorithm must be able to mark a duration measurement with value 9 or 11 as an outlier instead of assigning it to the same micro-cluster as for the delay measurements with value 10. This implies that the radius threshold of a micro-cluster in this scenario must be smaller than 1. However, for another pair of processing actions whose normal delay is around 100 seconds, the deviation of 1 second is normal and tolerable. But if the radius threshold remains smaller than 1, delay measurements with value 100 and 101 will be assigned to two different micro-clusters. Although HDDStream includes an on-demand offline procedure in which the online maintained micro-clusters are further grouped to extract the final clusters, and in this procedure the two micro-clusters compressing measurements 100 and 101 respectively will probably be merged together, it is not a desired solution since the offline micro-cluster grouping step introduces additional processing overhead. What is worse, real abnormal situations cannot be distinguished from normal situations until the offline micro-cluster grouping step is performed, which is against the goal of timely anomaly detection.

To cope with this problem, the radius threshold in our solution is expressed as a percentage relative to the center of a micro-cluster. For example, given the radius threshold being 10%, the radius boundary of a micro-cluster with center at 10 is 1 (=10×10%), while the radius boundary of a micro-cluster with center at 100 is 10 (=100×10%). The actual radius threshold is derived from the use case itself. For instance, if any deviation bigger than 1% of the regular delay between a pair of processing actions needs to be detected, then the radius threshold will be set to 1%. As a result, the additional offline clustering over the so-far extracted micro-clusters can be skipped and the micro-clusters themselves could be regarded as the final clusters. Nevertheless, the offline procedure can still be applied on demand to improve the quality of the clustering results.

Two-Level Clustering.

In a single processing step, some processing actions can be conducted multiple times. An example is shown in diagram 300 of FIG. 3. One can observe that one raising edge of Sensor X is followed by two raising edges of Sensor Y. To describe the correlation between these two sensors, both delay measurements ($t_2-t_1$ and $t_3-t_1$) are required. Although the deviation between these two measurements may be tiny, they represent different interaction semantics and should not be assigned to the same cluster. To guarantee the correct correlation semantics, one can assign each delay measurement a Class ID (Class 1 and Class 2) before performing clustering. One can also tune the clustering algorithm accordingly to ensure that measurements with different class IDs will not be assigned to the same micro-cluster. As a result, all micro-clusters of a certain sensor correlation are maintained in a hierarchical way. A set of micro-clusters is maintained under each class ID and no micro-cluster can belong to two different classes. In the current implementation, the class ID is a simple integer value which is incrementally increased according to the number of so-far encountered different edge correlations in a single iteration of the corresponding processing step. Note that this tuning to the HDDStream algorithm is introduced only to facilitate our sensor data analysis scenario. It does not change the principle of the clustering algorithm.

Figure 3:
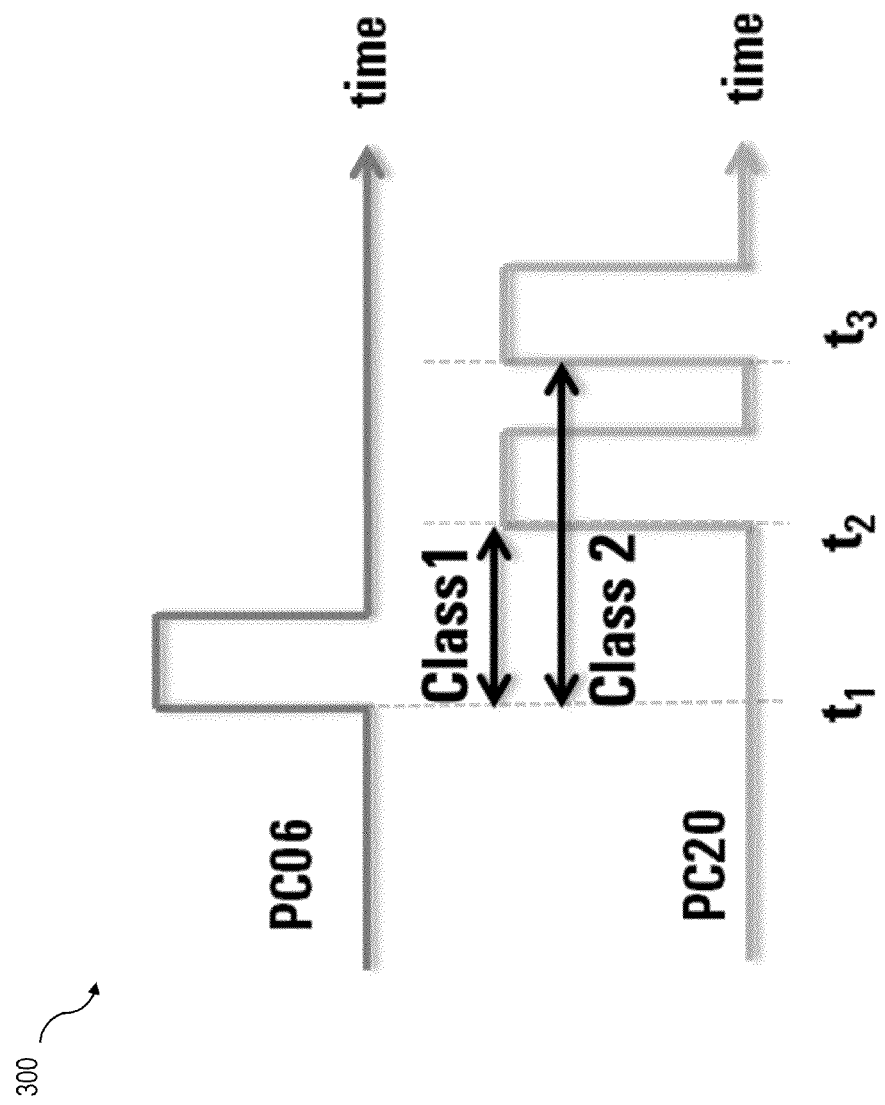
FIG. 3 is diagram illustrating two-level clustering.

The example in the diagram 300 of FIG. 3 also shows that there might exist multiple "regular" delay values for a given pair of processing actions. Indeed, the lower bound for the number of regular delay values is exactly the number of classes appeared in the given correlation.

Listing 1 gives the pseudo code of the revised clustering algorithm. The input to the clustering algorithm are delay measurements calculated based on the raw sensor data. Information contained in one data point p includes the value of the delay measurement, a timestamp as well as a class ID. For each newly arrived data point, the algorithm first check whether it belongs to an existing class (p.classID). If not, a new outlier micro cluster omc is initialized under the new class ID and the data point is assigned to it. If the class already exists, the algorithm tries to add p to its closest micro-clusters in the class. If p cannot be assigned to any existing micro-cluster in the class, a new outlier micro-cluster will be initialized for p.

Listing 1: Pseudo Code of the Clustering Algorithm.
Input: measurement data stream S=p1, p2, p3 . . .

```
clusterID = -1;
while (S has more data points ) {
    p(value; ts; classID) = next data point from S;
    if(p belongs to an existing class ) {
        pCoreMC = list of potential core micro-clusters in
            class p.classID;
        oMC = list of outlier micro - clusters in class p.classID;
        clusterID = add (p, pCoreMC, oMC);
        if(clusterID < 0) {
            Initialize a new outlier micro - cluster
                omc in class p.classID and add p to it;
            clusterID = omc.ID;
        }
    }
    else {
        Initialize a new outlier micro - cluster omc
            in class p.classID and add p to it;
        clusterID = omc.ID;
    }
}
return clusterID;
```

Listing 2: Pseudo Code of the Add Procedure.
Input: a data point p, pCoreMC and oMC;

```
distances: list of distances w.r.t p;
for(mc in pCoreMC [ oMC) {
    dist = distance between p and mc;
    distances.add (dist);
}
if (! empty (distances)) {
    mc_closest = getClosestMC (distances);
    Trial =checkRadiusBoundary (mc_closest, p);
    if(Trial == true ) {
        Add p to mc_closest;
        return mcclosest:ID;
    }
}
return -1;
```

The distance between a one-dimensional data point p and a micro-cluster mc is defined as follows:

$$dist(p, mc) = p - center(mc)$$

Analysis Procedure Summary.

Figure 4:
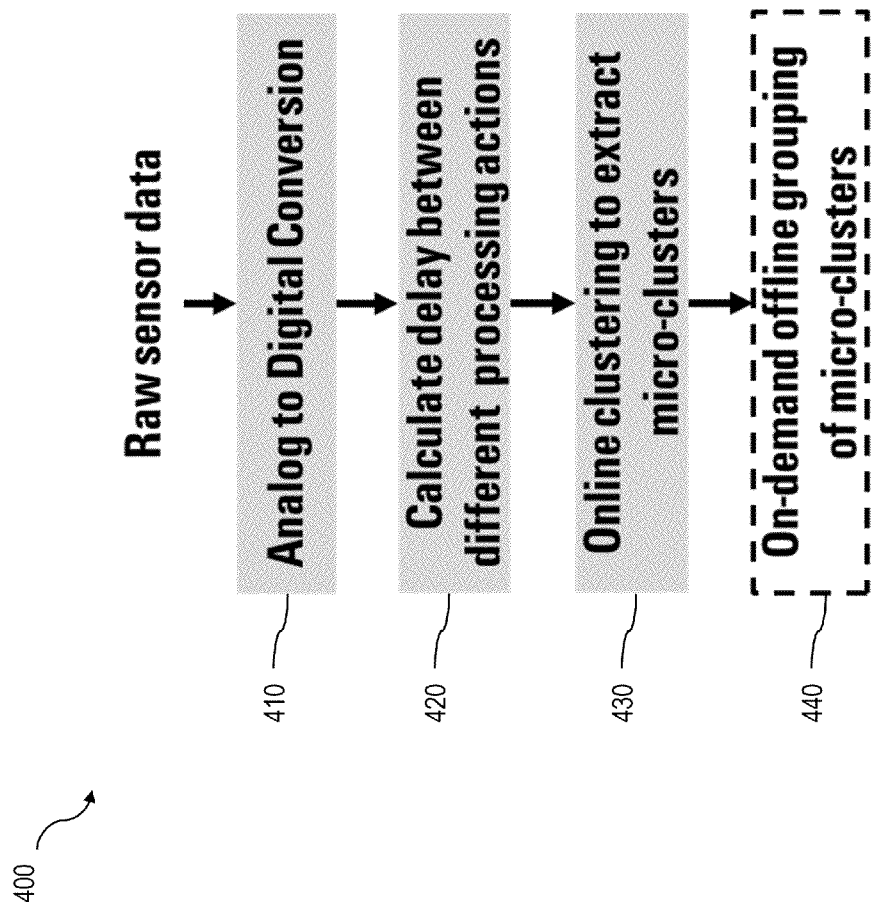
FIG. 4 is a process flow diagram illustrating a data analysis procedure.

The overall data analysis procedure is outlined in the process flow diagram 400 of FIG. 4. In the preprocessing step (410), analog sensor signals are converted into digital signals using user-specified rules. Next, based on the timestamps included in the sensor data, temporal delay between related processing actions is calculated (420) and analyzed with the online clustering algorithm (430, 440) The outcome of online clustering is a set of micro-clusters. As described above, one can tune the HDDStream algorithm to use a relative percentage instead of an absolute value to define the radius threshold. Because the radius threshold represents the maximum deviation that can be tolerated and it is derived from the use case itself, the online extracted micro-clusters can be regarded as final clusters, making the on-demand offline micro-cluster grouping step (440) only optional.

Selection of Correlations.

A high-tech manufacturing machine is composed of a large number of mechanical components. However, not every component pair has a strong correlation in terms of the action delay because they may be involved in different, unrelated processing steps. Due to the high complexity of manufacturing processing steps and the machine itself, system engineers usually have little a priori knowledge about which components are indeed involved in the same processing step and thus worth monitoring. To tackle this issue, a heuristic method can be provided for automatically selecting meaningful correlations using a training phase.

The rationale behind the proposed method is, that if a pair of machine components has strong interdependence, then all delay measurements between the corresponding processing actions over time should form only a few densely populated areas in the domain of the delay value. Any measurement whose value does not fall into any of these areas can be regarded as an outlier. When considering the expected clustering result, one would expect the clustering algorithm to produce only a limited number of clusters which summarize the majority of the delay measurements. These clusters are defined as regular clusters. Clusters which contain only few members are basically formed by outliers and are defined as outlier clusters. In other words, a component pair is meaningful for monitoring only when one could easily distinguish outlier clusters from regular clusters based on its clustering result.

In the training phase, one can first divide all sensors into groups based on, if any, priori knowledge about the manufacturing machine. For instance, a SABRE Electrofill system, which is widely used in the semiconductor industry, contains 3 electro plating cells for copper deposition and 3 postplating cells for wafer-postclean. Machine components in one cell do not interact with components in other cells. Therefore, sensors in the machine can be grouped based on cells and sensors in different groups will never be correlated with each other. If there is no such priori knowledge available for grouping sensors, all sensors will be put into the same group. However, grouping sensors based on prior knowledge is only a manual way to reduce the search space of the correlation selection procedure, thereby saving the computation resources. In the end the results with and without pre-sensor grouping will be identical.

For each sensor group the data analyzing approach outlined in Section 3 is applied to every sensor pair. However, aging can be turned off. Moreover, due to the lack of knowledge about the actual ordering between the processing actions, both correlation possibilities (Sensor A to Sensor B and Sensor B to Sensor A) need to be studied. One can now consider a single sensor group since the same method can be applied to any sensor group. One can only investigate the correlation between different sensors. That is, given N sensors in a group, there are $N \times (N-1)$ possible correlation pairs. At the end of the training phase, the following information can be obtained for each correlation pair:

number of generated delay measurements: N number of produced classes: l
number of produced clusters: k
number of delay measurements summarized by each cluster: $N_c = \{N_{c1}, \ldots, N_{ck}\}$ To find the most meaningful component correlations, one can first sort elements in $N_c$ in the descending order. The resulting list is denoted as Nc. The lower bound for the number of "regular" delay values between a certain pair of processing actions can be derived from the number of produced classes. Ideally, there should be only one regular cluster in each class (k=l), which is also the only cluster in this class, indicating that the corresponding pair of machine components interact without any exception. However, due to the existence of anomalies, usually the number of produced clusters is bigger than the number of classes (k>l). Therefore, one can introduce an error factor p to tolerate outliers existing in the dataset. The rule to determine whether a component correlation is meaningful for monitoring or not can be as follows:

A component correlation is meaningful for monitoring if:
1. $k <= \rho \cdot l$, where $\rho \geq 1$, or
2. $\Sigma(TOP_{\rho \cdot l}(N_c^{\downarrow})) \geq N\theta$, where $\theta \in (0,1]$ p·l defines the upper bound of the expected number of regular clusters. Chosing a bigger p means one can allow more clusters produced for a given component correlation to be treated as regular clusters. This, in turn, makes it easier for the component correlation under inspection to pass the first condition. Parameter θ, which one can name as coverage parameter, defines the expected proportion of delay measurements that which covered by the regular clusters. For example, θ=1 indicates that all delay measurements of the given correlation have to be covered by the allowed number (p×l) of regular clusters. By setting a smaller θ, this "coverage" requirement can be relaxed, thereby making the second condition easier to be passed. In general, the above rule is stricter when p and θ are set to a value close to 1.

Although this sensor pair selection procedure is mainly applied in the training phase, it can also be applied periodically at runtime to check whether the so-far selected correlations are still valid.

EXAMPLE

The following provides a specific example and while certain specifics are described, it should be appreciated that the fundamental teachings can be applied, in whole or in part, to other arrangements. To evaluate the current machine health monitoring approach, the inventors used a real-world dataset coming from one manufacturing machine monitored by 45 binary digital sensors (however, only 26 of them are active). As shown in Table 1 below, all active sensors form three groups. The monitoring data was generated at the frequency of 100 Hz. Each sensor had a unique identifier which is the same as the identifier of machine component being monitored. Each monitoring data was stamped by the time at which the data is produced.

TABLE 1

Distribution of active binary sensors in groups

| Sensor Group | # Active Binary Sensor | # Possible Correlation Pairs |
|---|---|---|
| Group 1 | 10 | 90 |
| Group 2 | 9 | 72 |
| Group 3 | 7 | 42 |

In the experiments, raw sensor data was replayed using a custom data generator, which can preserve the original data producing frequency. Moreover, the generator also allows for the configuration of a speedup parameter to further increase the data producing frequency. All the experiments were conducted on a machine with a two-core 2.26 GHz CPU and 4 GB RAM. First, the scalability of the proposed solution was evaluated in terms of the system throughput and the clustering latency with increasing number of correlation pairs under monitoring. System throughput in this regard was defined as the number of events that can be processed by the system per second. The influence of the parameter configuration on the result of meaningful correlation selection was also studied.

In the scalability test, only data from sensor group 1 was used. The speedup parameter of the data generator was set as 100, thereby fixing the input data rate from each sensor at 10,000 events/s. The number of sensors (n) was varied from 5 to 35 and it was assumed that interdependence existed between every two sensors. Although group 1 had only 10 binary sensors, additional sensor streams can be simulated by inverting the sensor value 1 or shifting the timestamps in an original sensor stream. The same dataset was replayed in each test run and the actual input rate was calculated by multiplying 10,000 with the number of sensors being monitored (10,000*n). The system throughput was then measured under each simulated workload and compared with the actual input data rate. It can be seen from diagram 500 of FIG. 5 that the system reaches its throughput capacity when monitoring 870 correlation pairs (30 sensors) simultaneously.

Under each simulated workload, the time needed to cluster the correlation samples (clustering latency) was also measured. A certain correlation pair which is a member of all the correlation pairs in each test run was selected, and the clustering latency for 100 consecutive correlation samples was measured starting from a fixed data time (12 hours after the time represented by the timestamp of the first raw sensor data in the dataset). Latency measurements are summarized and shown in the diagram 500 of FIG. 5 using boxplot. It can be seen that in general the clustering latency is very small when the system is not overloaded, and starts to increase after the system reaches its capacity.

Figure 5:
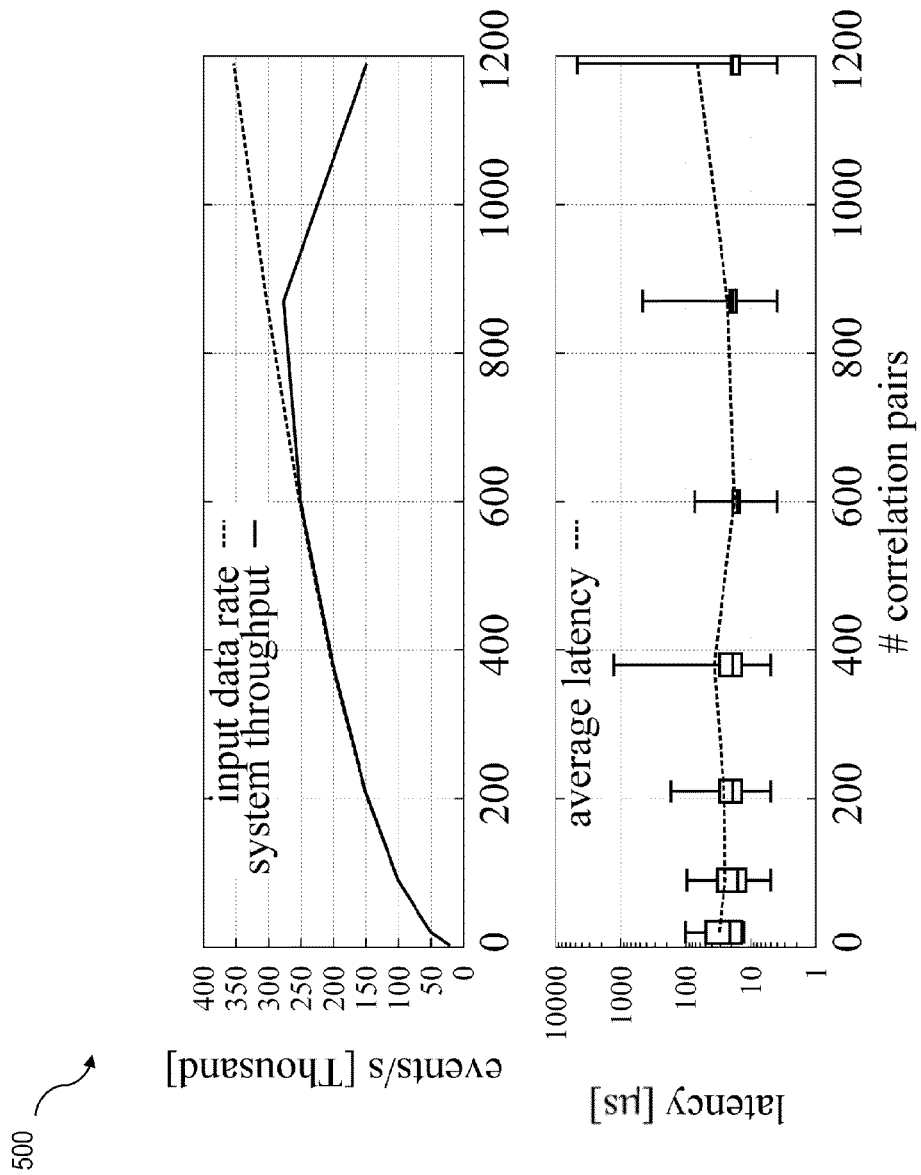
FIG. 5 is a diagram illustrating system throughput and clustering latency.

As shown in the diagram 500 of FIG. 5, with a given amount of computation resources and under a certain data rate, there exists an upper bound on the number of correlation pairs that can be monitored by the system.

Figure 6:
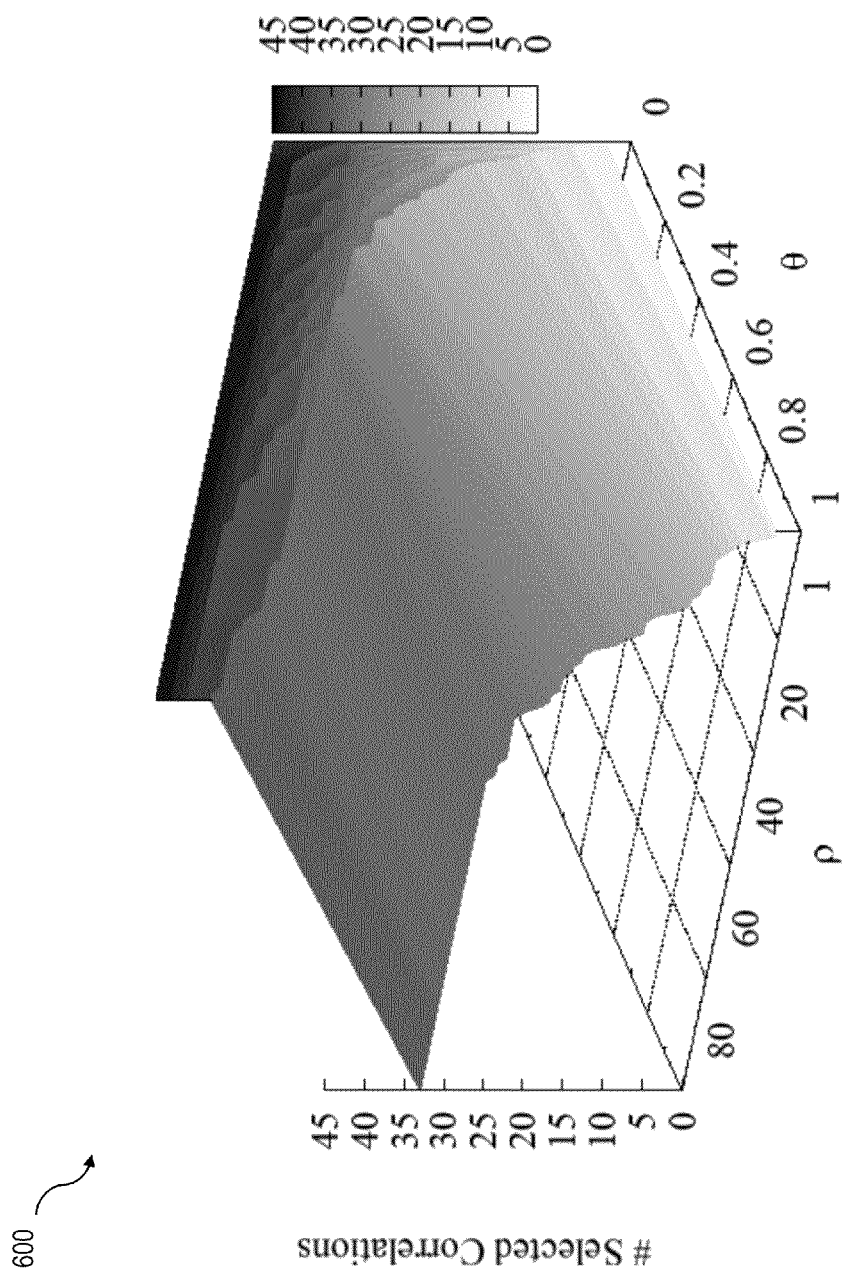
FIG. 6 is a diagram illustrating an influence of parameter settings on a correlation selection result.

With a naive correlation strategy, a lot of computation resources are wasted because not every component pair is meaningful for correlation. To find out the most meaningful component correlations, the method described above was applied to 24 hours' sensor data from all 3 sensor groups. Due to the existence of outliers in the given dataset, the number of selected correlation pairs varies with different parameter (p and θ) configurations. The stricter the selection condition is, the higher possibility that one of the filtering condition is violated, thereby resulting in a less number of component correlations to be selected by the algorithm. The diagram 600 of FIG. 6 shows the influence of the parameter setting on the selection result for sensor group 1.

Of note is that even with the most relaxed parameter configuration (p=100 and θ=0), the total number of selected correlations was 45 but not 90 (the number of all possible correlation pairs in sensor group 1). This is because, during the training period, the occurrence of the other 45 correlation pairs was not observed. For example, in each repeating processing step, a signal from sensor pp08 always appeared after the signal from sensor pp04, but not the other way round, which is similar to the scenario shown in diagram 200 of FIG.

2. Therefore, there is only the correlation from pp04 to pp08 but not the correlation in the other direction. Provided with this parameter influence chart shown in diagram 600 of FIG. 6, system engineers can tune parameters of the algorithm (p and θ) to tolerate the existence of outliers in a given dataset.

Component Interaction Diagrams.

Figure 7:
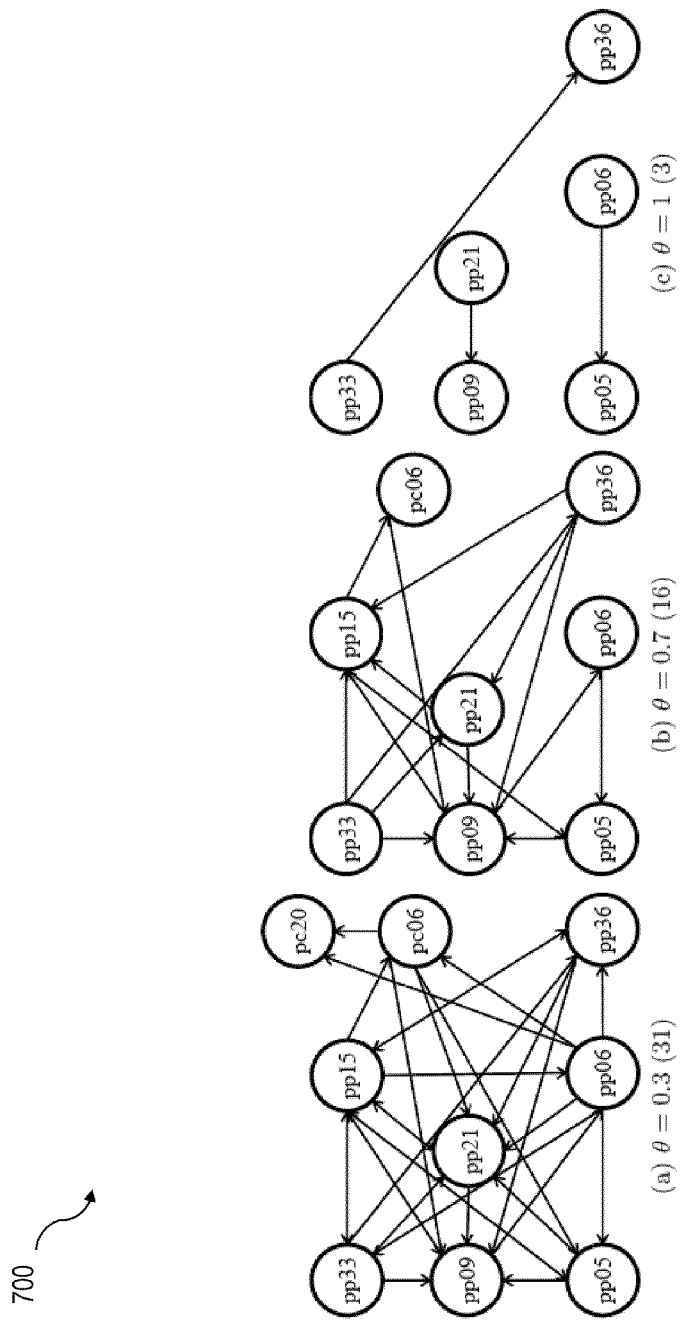
FIG. 7 is a diagram illustrating Component interaction diagrams for sensor group 2 with $\rho$ (=2) and increasing $\theta$.

In addition, for each parameter configuration, a component interaction diagram can be derived for each sensor group based on the selection result. A component interaction diagram can help system engineers to understand how machine components interact with each other within the machine. Diagram 700a of FIG. 7a shows the component interaction diagram for sensor group 2 with p=2 and θ=0.3. The number of component correlations appearing in the diagram is given in the brackets below the diagram 700a. Each circle in the diagram 700a represents a machine component. An arrow from component X to component Y indicates that component Y directly depends on component X temporally.

Figure 8:
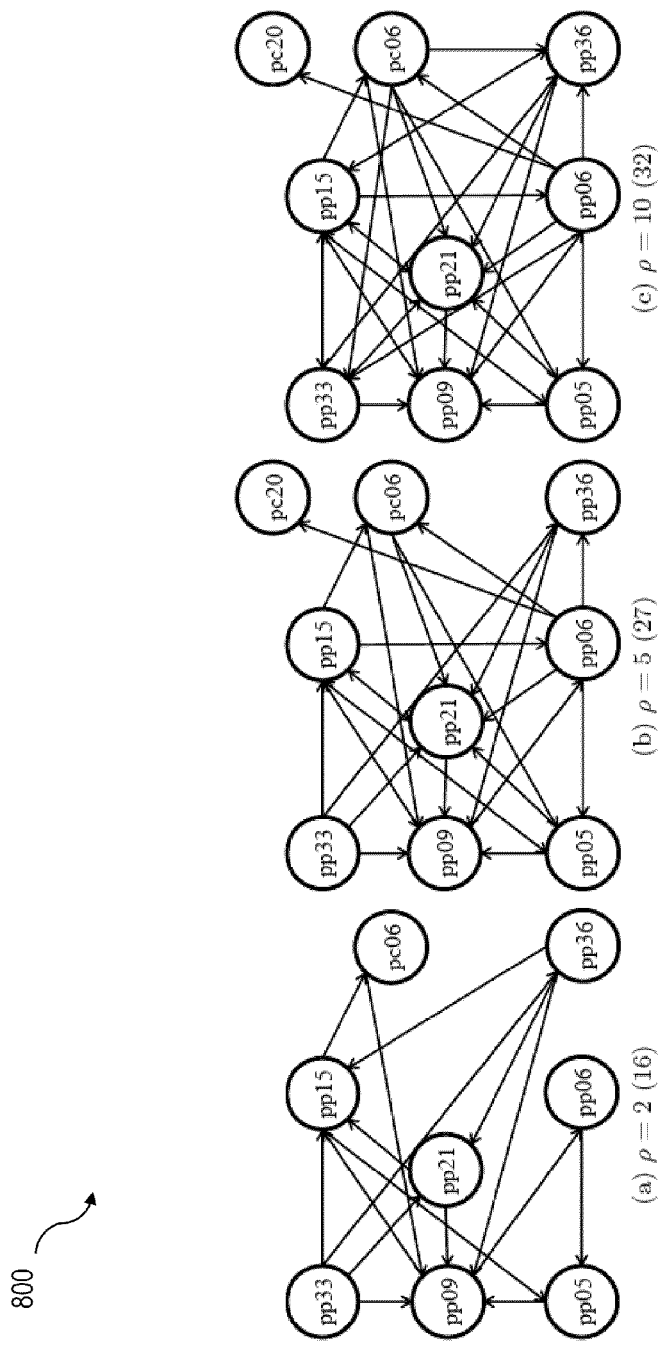
FIG. 8 is a diagram illustrating Component interaction diagrams for sensor group 2 with increasing $\rho$ and $\theta=(0:7)$.
Figure 9:
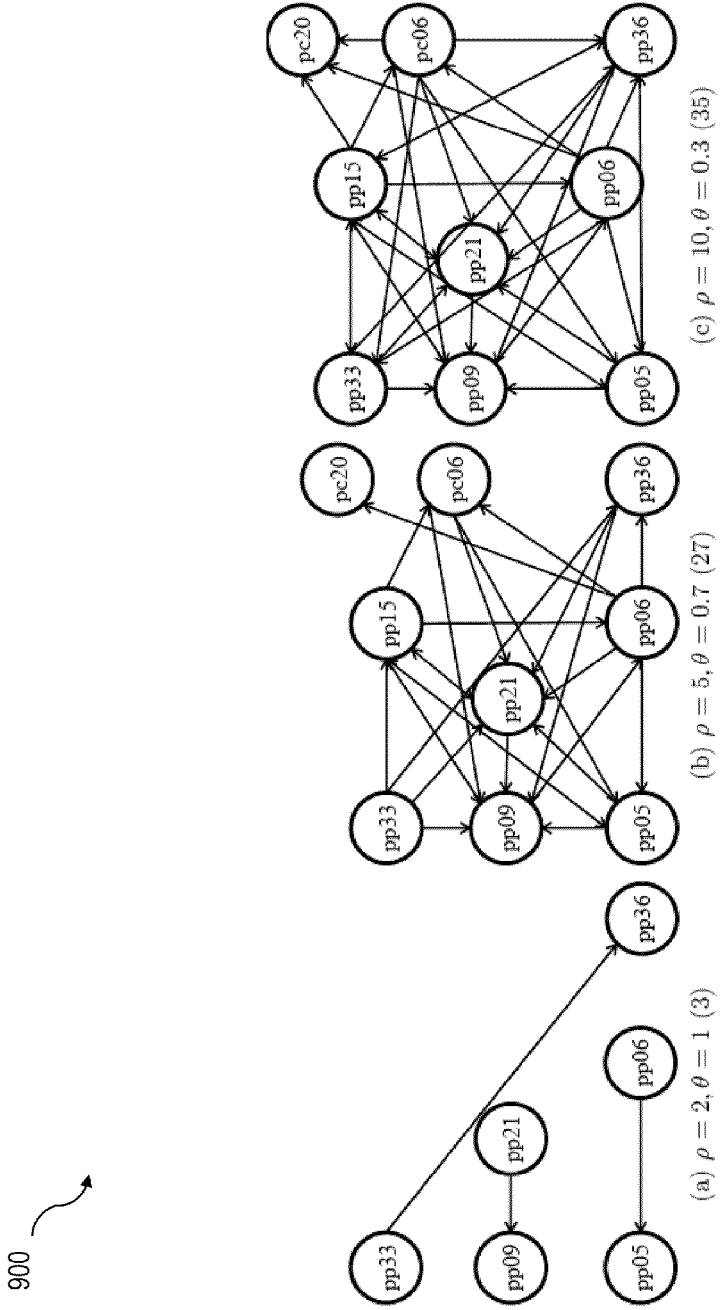
FIG. 9 is a diagram illustrating component interaction diagrams for sensor group 2 with increasing $\rho$ and decreasing $\theta$.

As mentioned above, the number of selected component correlations can be influenced by the parameter settings in the filtering rules. It is shown in the diagrams 700-900 of FIGS. 7-9. each of which contains a series of three component interaction diagrams, how the component interaction diagrams change with the parameter settings. In diagram 700 of FIG. 7, the error factor p is fixed and the coverage parameter θ is changed stepwise from 0.3 to 0.7 and 1. Diagram 800 of FIG. 8 shows the results when θ is fixed and p is changed from 2 to 5 and 10. Results for changing p and θ at the same time are shown in diagram 900 of FIG. 9. In all three figures, one can see that the component interaction diagrams evolve in a consistent way when selection conditions are relaxed or strengthened. Take diagram 800 of FIG. 8, as an example, when p is changed from 2 to 5, more action dependencies between machine components are revealed, but all the existing dependencies shown in diagram 700b of FIG. 7 can still be found in diagram 800a of FIG. 8. Similar behavior can be observed when strengthening the selection conditions: only existing action dependencies are filtered out and no new dependencies can be detected—see diagrams 700 of FIG. 7 and diagram 900 of FIG. 9. The meaningfulness of these component interaction diagrams have been verified by the Infineon engineers working with the machine.

Figure 10:
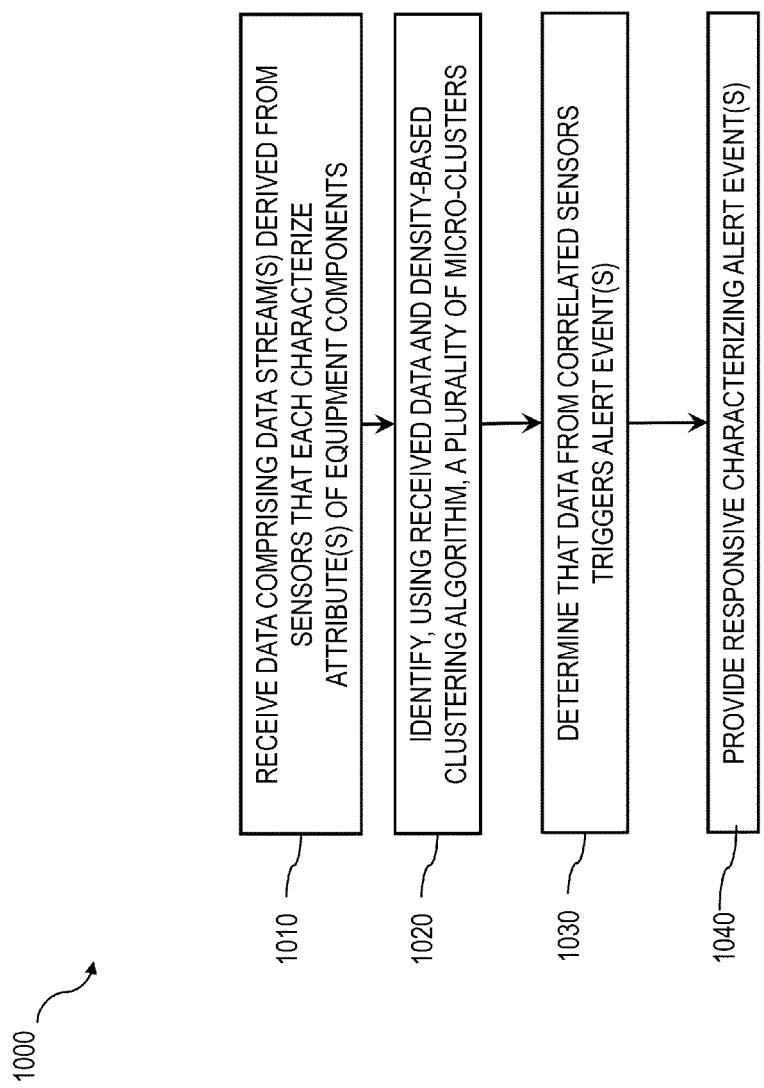
FIG. 10 is a process flow diagram illustrating a method for monitoring manufacturing equipment in real-time.

FIG. 10 is a process flow diagram illustrating a method 1000 in which, at 1010, data is received that comprises at least one data stream derived from each of a plurality of sensors that each characterize one or more attributes of equipment components. Thereafter, at 1020, using the received data and a density-based clustering algorithm that produces microclusters for each pair of sensors, correlated sensors having component correlations above a pre-defined threshold are identified. It can then be determined, at 1030, that data from two or more correlated sensors triggers at least one alert event. Subsequently, at 1040, data is provided that characterizes the at least one alert event.

One or more aspects or features of the subject matter described herein may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device (e.g., mouse, touch screen, etc.), and at least one output device.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, the subject matter described herein can be implemented on a computer having a display device, such as for example a cathode ray tube (CRT) or a liquid crystal display (LCD) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

The subject matter described herein may be implemented in a computing system that includes a back-end component (e.g., as a data server), or that includes a middleware component (e.g., an application server), or that includes a front-end component (e.g., a client computer having a graphical user interface or a Web browser through which a user may interact with an implementation of the subject matter described herein), or any combination of such back-end, middleware, or front-end components. The components of the system may be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

The subject matter described herein can be embodied in systems, apparatus, methods, and/or articles depending on the desired configuration. The implementations set forth in the foregoing description do not represent all implementations consistent with the subject matter described herein.

Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flow(s) depicted in the accompanying figures and/or described herein do not necessarily require the particular order shown, or sequential order, to achieve desirable results. Other implementations may be within the scope of the following claims.

What is claimed is:

1. A method comprising:
receiving data comprising at least one data stream derived from each of a plurality of sensors that each characterize one or more attributes of equipment components;
identifying, using the received data and a density-based clustering algorithm that produces micro-clusters for each pair of sensors, correlated sensors having component correlations above a pre-defined threshold;
determining that data from two or more correlated sensors triggers at least one alert event; and
providing data characterizing the at least one alert event.

2. A method as in claim 1, wherein the density-based clustering algorithm comprises an HDDStream algorithm.

3. A method as in claim 1, further comprising:
identifying component correlations by generating clusters by observing temporal dependencies among processing actions and/or behavior of individual components for each of a plurality of paired sensors during operation of the equipment components; and
dropping component interactions having criteria below a pre-defined threshold.

4. A method as in claim 3, wherein the component correlations are identified during a pre-defined training period.

5. A method as in claim 4, wherein the component correlations are identified during run-time.

6. A method as in claim 1, wherein providing data comprises one or more of:
displaying the data characterizing the alert event, loading the data characterizing the alert event, storing the data characterizing the alert event, and transmitting the data characterizing the alert event to a remote system.

7. A method as in claim 1, wherein providing data characterizing comprises:
rendering and displaying an event correlation diagram characterizing the alert event.

8. A method as in claim 1, wherein providing data characterizing comprises:
rendering and displaying a component interaction diagram characterizing the alert event.

9. A method as in claim 1, wherein at least one of the receiving, identifying, determining, and providing is implemented by at least one data processor of at least one computing system.

10. A non-transitory computer program product storing instructions, which when executed by at least one data processor of at least one computing system, result in operations comprising:
receiving data comprising at least one data stream derived from each of a plurality of sensors that each characterize one or more attributes of equipment components;
identifying, using the received data and a density-based clustering algorithm that produces micro-clusters for each pair of sensors, correlated sensors having component correlations above a pre-defined threshold;
determining that data from two or more correlated sensors triggers at least one alert event; and
providing data characterizing the at least one alert event.

11. A computer program product as in claim 10, wherein the density-based clustering algorithm comprises an HDD Stream algorithm.

12. A computer program product as in claim 10, wherein the operations further comprise:
identifying component correlations by generating clusters by observing temporal dependencies among processing actions and/or behavior of individual components for each of a plurality of paired sensors during operation of the equipment components; and
dropping component interactions having criteria below a pre-defined threshold.

13. A computer program product as in claim 12, wherein the component correlations are identified during a pre-defined training period.

14. A computer program product as in claim 13, wherein the component correlations are identified during run-time.

15. A computer program product as in claim 10, wherein providing data comprises one or more of: displaying the data characterizing the alert event, loading the data characterizing the alert event, storing the data characterizing the alert event, and transmitting the data characterizing the alert event to a remote system.

16. A computer program product as in claim 10, wherein providing data characterizing comprises:
rendering and displaying an event correlation diagram characterizing the alert event.

17. A computer program product as in claim 10, wherein providing data characterizing comprises:
rendering and displaying a component interaction diagram characterizing the alert event.

18. A system comprising:
at least one data processor; and
memory storing instructions, which when executed by the at least one data processor of at least one computing system, cause the at least one data processor to perform operations comprising:
receiving data comprising at least one data stream derived from each of a plurality of sensors that each characterize one or more attributes of equipment components;
identifying, using the received data and a density-based clustering algorithm that produces micro-clusters for each pair of sensors, correlated sensors having component correlations above a pre-defined threshold;
determining that data from two or more correlated sensors triggers at least one alert event; and
providing data characterizing the at least one alert event.

19. A system as in claim 18, wherein the density-based clustering algorithm comprises an HDDStream algorithm.

20. A system as in claim 18, wherein the operations further comprise:
identifying component correlations by generating clusters by observing temporal dependencies among processing actions and/or behavior of individual components for each of a plurality of paired sensors during operation of the equipment components; and
dropping component interactions having criteria below a pre-defined threshold.

* * * * *